US008337974B2

(12) United States Patent
Hennige et al.

(10) Patent No.: US 8,337,974 B2
(45) Date of Patent: Dec. 25, 2012

(54) CERAMIC MEMBRANE BASED ON A SUBSTRATE CONTAINING POLYMER OR NATURAL FIBRES, METHOD FOR THE PRODUCTION AND USE THEREOF

(75) Inventors: Volker Hennige, Duelmen (DE); Christian Hying, Rhede (DE); Gerhard Hoerpel, Nottuln (DE)

(73) Assignee: Evonik Degussa GmbH, Essen (DE)

( * ) Notice: Subject to any disclaimer, the term of this patent is extended or adjusted under 35 U.S.C. 154(b) by 574 days.

(21) Appl. No.: 10/501,713

(22) PCT Filed: Jan. 14, 2003

(86) PCT No.: PCT/EP03/00257
§ 371 (c)(1),
(2), (4) Date: Jul. 19, 2004

(87) PCT Pub. No.: WO03/072231
PCT Pub. Date: Sep. 4, 2003

(65) Prior Publication Data
US 2005/0070193 A1 Mar. 31, 2005

(30) Foreign Application Priority Data

Feb. 26, 2002 (DE) .................................. 102 08 280

(51) Int. Cl.
*B32B 3/10* (2006.01)
(52) U.S. Cl. .......... 428/131; 428/220; 442/76; 442/164; 442/168; 442/170; 427/397.7
(58) Field of Classification Search ............. 210/500.27; 442/76, 164, 168, 170; 428/131, 220; 427/397.7
See application file for complete search history.

(56) References Cited

U.S. PATENT DOCUMENTS

| | | | |
|---|---|---|---|
| 5,324,579 A * | 6/1994 | Sassa et al. | 442/324 |
| 5,639,555 A * | 6/1997 | Bishop | 428/447 |
| 5,885,657 A | 3/1999 | Penth | |
| 6,299,668 B1 | 10/2001 | Penth et al. | |
| 6,299,778 B1 | 10/2001 | Penth et al. | |
| 6,309,545 B1 | 10/2001 | Penth et al. | |
| 6,340,379 B1 | 1/2002 | Penth et al. | |
| 6,383,386 B1 | 5/2002 | Hying et al. | |
| 6,620,320 B1 | 9/2003 | Hying et al. | |
| 7,083,828 B2 | 8/2006 | Muller et al. | |
| 7,691,529 B2 | 4/2010 | Hennige et al. | |
| 7,892,673 B2 | 2/2011 | Hennige et al. | |
| 8,053,102 B2 | 11/2011 | Hennige et al. | |
| 2002/0062737 A1 | 5/2002 | Guiver et al. | |
| 2004/0154106 A1 | 8/2004 | Oles et al. | |
| 2005/0103457 A1 | 5/2005 | Nun et al. | |
| 2006/0049376 A1 | 3/2006 | Nun et al. | |
| 2006/0128239 A1 | 6/2006 | Nun et al. | |
| 2006/0141223 A1 | 6/2006 | Oles et al. | |
| 2006/0156475 A1 | 7/2006 | Oles et al. | |
| 2006/0222815 A1 | 10/2006 | Oles et al. | |
| 2008/0032197 A1 | 2/2008 | Horpel et al. | |
| 2008/0190841 A1 | 8/2008 | Pascaly et al. | |
| 2008/0274394 A1 | 11/2008 | Schormann et al. | |
| 2009/0269489 A1 | 10/2009 | Hennige et al. | |
| 2010/0000079 A1 | 1/2010 | Hörpel et al. | |
| 2010/0003401 A1 | 1/2010 | Hörpel et al. | |
| 2011/0206971 A1 | 8/2011 | Hennige et al. | |

FOREIGN PATENT DOCUMENTS

| | | |
|---|---|---|
| DE | 2 776 534 | 10/1999 |
| WO | 99/15262 | 4/1999 |
| WO | 00/21648 | 4/2000 |

OTHER PUBLICATIONS

"Silane Coupling Agents", 2nd edition, Plueddemann, 1991, pp. 31-32 and 153.*
Inorganic Polymer Engineering Materials, M.L. Stone, pp. 1-32, Jun. 1993.*
U.S. Appl. No. 10/575,734, filed Apr. 13, 2006, Hoerpel, et al.
U.S. Appl. No. 10/575,759, filed Apr. 13, 2006, Hennige, et al.
U.S. Appl. No. 10/575,268, filed Apr. 11, 2006, Hennige, et al.
U.S. Appl. No. 10/575,274, filed Apr. 11, 2006, Hennige, et al.
U.S. Appl. No. 10/524,665, filed Feb. 11, 2005, Hennige, et al.
U.S. Appl. No. 10/536,270, filed May 25, 2005, Hennige, et al.
U.S. Appl. No. 10/535,400, filed May 18, 2005, Hennige, et al.
U.S. Appl. No. 10/524,669, filed Feb. 11, 2005, Hennige, et al.
U.S. Appl. No. 10/524,145, filed Feb. 11, 2005, Hennige, et al.
U.S. Appl. No. 10/524,143, filed Feb. 11, 2005, Hennige, et al.
U.S. Appl. No. 10/519,097, filed Dec. 27, 2004, Hennige, et al.
U.S. Appl. No. 10/487,245, filed Feb. 27, 2004, Hennige, et al.
U.S. Appl. No. 10/504,144, filed Aug. 19, 2004, Hennige, et al.
U.S. Appl. No. 09/891,314, filed Jun. 27, 2001, Tieke, et al.
U.S. Appl. No. 10/297,581, filed Apr. 23, 2003, Hying, et al.
U.S. Appl. No. 10/450,247, filed Jun. 12, 2003, Hennige, et al.
U.S. Appl. No. 10/433,488, filed Jun. 13, 2003, Hennige, et al.
U.S. Appl. No. 10/498,501, filed Jun. 18, 2004, Hennige, et al.
U.S. Appl. No. 09/941,587, filed Aug. 30, 2001, Penth, et al.
U.S. Appl. No. 09/956,915, filed Sep. 21, 2001, Penth, et al.
U.S. Appl. No. 10/588,952, filed Aug. 10, 2006, Nun, et al.
U.S. Appl. No. 11/572,548, filed Jan. 23, 2007, Nun, et al.
U.S. Appl. No. 11/578,664, filed Oct. 18, 2006, Hoerpel, et al.
U.S. Appl. No. 11/917,914, filed Dec. 18, 2007, Holzapfel, et al.
U.S. Appl. No. 12/063,626, filed Feb. 12, 2008, Hying, et al.
U.S. Appl. No. 12/388,671, filed Feb. 19, 2009, Hennige, et al.
U.S. Appl. No. 13/266,940, filed Oct. 28, 2011, Pascaly, et al.

* cited by examiner

Primary Examiner — Elizabeth Cole
(74) Attorney, Agent, or Firm — Oblon, Spivak, McClelland, Maier & Neustadt, L.L.P.

(57) ABSTRACT

The present invention relates to membranes and to a process for making them.
The membranes according to the invention comprise a sheetlike flexible substrate having a multiplicity of openings and having a coating on and in said substrate, the material of said substrate being selected from nonwovens of polymeric fibers, said nonwovens having a porosity of more than 50% and said coating being a porous ceramic coating, said substrate preferably being from 10 to 200 μm in thickness. Such membranes provide a distinctly higher flux than conventional membranes.
The membranes are useful as separators for batteries or as a microfiltration membrane.

47 Claims, No Drawings

CERAMIC MEMBRANE BASED ON A SUBSTRATE CONTAINING POLYMER OR NATURAL FIBRES, METHOD FOR THE PRODUCTION AND USE THEREOF

The present invention relates to a membrane, especially a microfiltration membrane, comprising a substrate based on polymeric or natural fibers and a ceramic coating, a process for making the membrane and the use of the membrane.

Various applications are known for ceramic composites.

The advantage of ceramic composites is that the ceramic coatings are chemically inert to most chemical substances, for example organic solvents, and also predominantly resistant to acids or alkalis. Accordingly, metals are often coated with ceramics to protect the metal against chemical influences. The porous surface of a ceramic-coated composite, moreover, enhances the abrasion resistance of subsequently applied paints or protective coatings. Ceramics themselves, having a porous surface, are also very useful as membranes or filters.

The disadvantage of ceramics or ceramic composites is the brittleness of the ceramic. Ceramic-coated metals are therefore very impact-sensitive and the ceramic coating hardly survives any mechanical exposure without the surface of the ceramic being damaged. Since, moreover, the bending of such a ceramic composite leads to a damaged ceramic layer, the areas in which such ceramic composites can be used are still limited at present.

Notwithstanding their disadvantages, ceramic composites are frequently also used in filtration engineering or membrane engineering.

EP 0 358 338 describes a method which comprises applying to a surface, preferably a smooth metal surface, an aqueous solution comprising a metal oxide sol and solidifying this solution to form a protective ceramic coat on the surface. The aqueous solution may include a metal oxide powder and/or an adhesion promoter to improve the adhesion of the ceramic layer to the surface to be protected. The application of layers to pervious carrier materials is not described.

WO 96/00198 teaches the production of ceramic layers on surfaces of various materials. These coated materials can be used as membranes for nanofiltration. In this process, titanium dioxide sol is dispersed with alumina powder using hydrochloric acid for peptization.

U.S. Pat. No. 4,934,139 teaches a process for producing ceramic membranes for ultrafiltration and microfiltration. A sol or a particle suspension is applied to a porous metal carrier and sintered to produce such ceramic membranes. The porous carrier can be stainless steel sintered metal or woven stainless steel fabric having metal particles sintered into its interstices. Woven metal fabrics having interstices above 100 μm cannot be produced by this process without sintering in metal particles. The process avoids suspension or sol penetrating into the interstices of the carrier material.

U.S. Pat. Nos. 5,376,442 and 5,605,628 have an organic binder being incorporated into the coating solution to bridge interstices in the carrier material. This binder has to be removed again in the solidifying step, and this can lead to irregularities in the ceramic surface and/or structure.

Similarly, DE 42 10 413 has the inorganic powder being fixed by means of a polymeric resin. This resin likewise has to be removed again in the solidifying step, and this can lead to irregularities in the ceramic surface and/or structure.

WO 99/15262 describes the production of a flexible pervious composite based on a perforate carrier material. The carrier here can consist of various materials, including polymeric apertured films, wovens composed of polymer, natural fiber, glass and steel or metal nonwovens. The coating is effected using a sol very largely consisting of water, or of aqueous solutions of strong acids, into which particles of the oxides of aluminum, titanium, zirconium or silicon have been stirred. The sol may further contain organosilyl compounds such as methyltriethoxysilane. These pervious composite materials are useful inter alia as membranes in filtration.

All microfiltration membranes described hitherto have a fairly low transmembrane flux. In addition, the ceramic coatings are brittle and are easily detached from the carrier in the use of such membranes when adhesion is too low. Such membranes are then inutile.

It is an object of the present invention to provide a flexible membrane which has a high transmembrane flux and is more durable than prior art membranes.

It has been found that this object is achieved, surprisingly, by using polymeric nonwoven materials instead of apertured films to provide a distinct increase in the transmembrane flux. This is due to the greater porosity of the nonwoven. It has further been determined that, surprisingly, membranes comprising nonwoven materials based on polymers are distinctly more durable and flexible than membranes comprising ceramic coatings on glass or metal wovens or nonwovens or on polymer films.

The present invention accordingly provides a membrane comprising a sheetlike flexible substrate having a multiplicity of openings and having a porous coating on and in said substrate, said coating comprising inorganic components, characterized in that the material of said substrate is selected from nonwovens of polymeric or natural fibers, said nonwovens having a porosity of more than 50% and said coating being a porous ceramic coating.

The present invention further provides a process for producing a membrane according to the invention, which comprises providing a sheetlike flexible substrate having a multiplicity of openings with a coating in and on said substrate, the material of said substrate being selected from nonwovens of polymeric fibers, and said coating being a porous ceramic coating which is brought onto and into said substrate by applying a suspension, comprising at least one oxide of the metals Al, Zr, Si, Sn, Ti and/or Y and a sol, onto the substrate and heating one or more times to solidify said suspension on and in said substrate.

The present invention similarly provides for the use of a membrane according to the invention as a separator in batteries, as a carrier for ultrafiltration, nano-filtration, reverse osmosis, gas separation or pervaporation membranes or as a microfiltration membrane.

One advantage of the membranes according to the invention is that the transmembrane flux is distinctly higher than for conventional membranes. The increase in the transmembrane flux over membranes based on apertured polymer films is about 150%. This is attributable to the fact that the nonwoven materials themselves have a distinctly larger porosity than the films used. Therefore, the open filter area of the resulting materials on nonwovens is likewise distinctly larger. This, as a result of the enlarged effective filtration area, also brings about a distinct increase in the filtration performance or flux.

The membranes according to the invention are also distinctly more durable than membranes, especially composite membranes, available to date. It is believed that this is due to the irregular structure of the nonwoven used as a carrier. Woven fabrics contain a regularly spaced arrangement of knurls, ie. locations where the fibers are superposed. These regular knurls are locations for breakages or kinks, since the ceramic coating is not as thick in these locations as between the knurls. The regularity of the knurls in the case of membranes based on woven fabrics can have a perforation effect and cause the membrane to crack in this location. This problem can be remedied by the use of a nonwoven as a substrate or carrier because the arrangement of the knurls in a nonwoven is not regular.

A further advantage of the polymeric nonwoven supported membranes according to the invention is that they are much less costly than alternative materials which might be used for high-flux membranes. A metal nonwoven costs about €1250/$m^2$, but a polymeric nonwoven less than € 15/$m^2$. Composite membranes are therefore now obtainable that can be produced so economically that they open up new markets which were previously inaccessible because of the high cost. These markets are particularly located in the field of the filtration of drinking and waste water, where membranes costing more than €500/$m^2$ cannot be used.

The membrane according to the invention will now be described without the invention being limited thereto.

The membrane according to the invention, comprising a sheetlike flexible substrate having a multiplicity of openings and having a porous coating on and in the substrate, the coating comprising inorganic components, is notable for the material of the substrate being selected from nonwovens of polymeric or natural fibers, the nonwovens having a porosity of more than 50%, and the coating being a porous ceramic coating. The substrate preferably has a porosity of 50 to 97%, more preferably of from 60 to 90% and most preferably of from 70 to 90%. Porosity in this context is defined as the volume of the nonwoven 100% minus the volume of the fibers of the nonwoven, ie. the fraction of the nonwoven volume which is not filled up by material. The volume of the nonwoven can be calculated from the dimensions of the nonwoven. The volume of the fibers is calculated from the measured weight of the nonwoven in question and the density of the polymeric fibers. The large porosity of the substrate also means a higher porosity for the membrane according to the invention, which is why higher transmembrane fluxes are obtainable with the membrane according to the invention.

The membrane according to the invention also preferably comprises a substrate which is from 10 to 200 μm in thickness. It can be particularly advantageous for the membrane according to the invention to comprise a substrate which is from 30 to 100 μm, preferably from 25 to 50 μm and particularly preferably from 30 to 40 μm in thickness. The low thickness of the substrate used is another reason why the transmembrane flux through the membrane is higher than in the case of conventional membranes.

The polymeric fibers are preferably selected from a polyacrylonitrile, polyamides, polyimides, polyacrylates, polytetrafluoroethylene, polyester, for example polyethylene terephthalate, and/or polyolefins, for example polypropylene or polyethylene, or mixtures thereof. But all other known polymeric fibers and many natural fibers such as for example flax fibers, cotton or hemp fibers are conceivable as well. The membrane according to the invention preferably comprises polymeric fibers which have a softening temperature of more than 100° C. and a melting temperature of more than 110° C. The range of possible uses is smaller in the case of polymeric fibers having lower temperature limits. Preferred membranes can be used up to a temperature of up to 150° C., preferably up to a temperature of from 120 to 150° C. and most preferably up to a temperature of 121° C. It can be advantageous for the polymeric fibers to be from 1 to 25 μm and preferably from 2 to 15 μm in diameter. Were the polymeric fibers to be distinctly thicker than the ranges mentioned, the flexibility of the substrate and hence also of the membrane would suffer.

Polymeric fibers for the purposes of the present invention also comprehend the fibers of polymers which have been partially changed chemically or structurally by a thermal treatment, for example partially carbonized polymeric fibers.

The ceramic coating on and in the substrate preferably comprises an oxide of the metals Al, Zr, Si, Sn, Ti and/or Y. Preferably the coating on and in the substrate comprises an oxide of the metals Al, Zr, Ti and/or Si as an inorganic component.

It can be advantageous for the ceramic coating or the inorganic components which make up the coating to be attached to the substrate, especially to the polymeric fibers, via adhesion promoters. Typical adhesion promoters include organofunctional silanes as available for example from Degussa under the trade name Dynasilane, but also pure oxides such as $ZrO_2$, $TiO_2$, $SiO_2$ or $Al_2O_3$ can be suitable adhesion promoters for some fiber materials. Depending on manufacturing conditions and adhesion promoter used, the adhesion promoters can still be detectable in the membrane according to the invention.

It can be advantageous for the nonwoven or woven to have been first precoated with an adhesion promoter. Accordingly, such a membrane will then include in its interior a nonwoven, preferably a polymeric nonwoven, whose fibers bear a thin layer of an adhesion promoter, as of a metal oxide or of an organosilane compound. The porous ceramic material is present in and on the precoated polymeric carrier.

The coating preferably includes at least one inorganic component in a particle size fraction having an average particle size of from 1 to 250 nm or having an average particle size of from 251 to 10 000 nm or from 1000 to 10 000 nm and particularly preferably from 250 to 1750 nm. It can be advantageous for the membrane according to the invention to comprise a coating which comprises at least two particle size fractions of at least one inorganic component. It can similarly be advantageous for the coating to comprise at least two particle size fractions of at least two inorganic components. The particle size ratio can be from 1 to 1 to 1 to 10 000 and preferably from 1 to 1 to 1 to 100. The amount ratio of the particle size fractions of the composite material can preferably be from 0.01 to 1 to 1 to 0.01.

One of the factors which limits the perviousness and the porosity and hence also the transmembrane flux of the membrane according to the invention is the particle size of the inorganic components used.

The membrane according to the invention preferably has a porosity of from 10% to 70%, more preferably of from 20% to 60% and most preferably of from 30% to 50%. Porosity as understood here relates to the accessible, ie. open, pores. The porosity can be determined via the known method of mercury porosimetry or can be calculated from the volume and the density of the materials used on the assumption that open pores are present exclusively. The average pore size of the membrane according to the invention is preferably in the range from 10 to 2000 nm and most preferably in the range from 50 to 800 nm.

The membranes according to the invention have a tensile strength of at least 1 N/cm, preferably of 3 N/cm and most preferably of more than 6 N/cm. The membranes according to the invention are preferably flexible and are preferably bendable around a radius down to 100 m, more preferably down to 50 mm and most preferably down to 2 mm without damage. The good bendability of the membrane according to the invention has the advantage that the membrane is easily able to withstand sudden pressure fluctuations without damage when used in microfiltration.

The membrane according to the invention is preferably obtainable by a process for producing a membrane, which comprises providing a sheetlike flexible substrate having a multiplicity of openings with a coating in and on said substrate, the material of said substrate being selected from nonwovens of polymeric or natural fibers, said nonwovens preferably having a porosity of more than 50%, and said coating being a porous ceramic coating which is brought onto said substrate by applying a suspension, comprising at least one oxide of the metals Al, Zr, Si, Sn, Ti and/or Y and a sol, onto the substrate and heating one or more times to solidify said suspension on and in said substrate. The suspension may include further inorganic components, especially inorganic components as already described above as inorganic components.

The suspension may be brought onto and into a substrate by, for example, printing on, pressing on, pressing in, rolling on, knifecoating on, spreadcoating on, dipping, spraying or pouring on.

The material of the substrate is preferably selected from polymeric fiber nonwovens from 10 to 200 μm in thickness. It can be advantageous for the membrane according to the invention to comprise a substrate from 30 to 100 μm and preferably from 25 to 50 μm in thickness.

The polymeric fibers are preferably selected from a polyacrylonitrile, polyamides, polyimides, polyacrylates, polytetrafluoroethylene, polyester, for example polyethylene terephthalate, and/or polyolefins. But all other known polymeric fibers and many natural fibers can be used as well. The membrane according to the invention preferably comprises polymeric fibers which have a softening temperature of more than 100° C. and a melting temperature of more than 110° C. The range of possible uses is smaller in the case of polymeric fibers having lower temperature limits. Preferred membranes can be used up to a temperature of up to 150° C., preferably up to a temperature of from 120 to 150° C. and most preferably up to a temperature of 121° C. It can be advantageous for the polymeric fibers to be from 1 to 25 μm and preferably from 2 to 15 μm in diameter. Were the polymeric fibers to be distinctly thicker than the ranges mentioned, the flexibility of the substrate and hence also of the membrane would suffer.

The suspension used for preparing the coating preferably comprises at least one inorganic oxide of aluminum, of titanium, of silicon and/or of zirconium and at least one sol, at least one semimetal oxide sol or at least one mixed metal oxide sol or a mixture thereof, and is prepared by suspending at least one inorganic component in at least one of these sols.

The sols are obtained by hydrolyzing at least one compound, preferably at least one metal compound, at least one semimetal compound or at least one mixed metal compound. The compound to be hydrolyzed is preferably at least one metal nitrate, a metal chloride, a metal carbonate, a metal alkoxide compound or at least one semimetal alkoxide compound, particularly preferably at least one metal alkoxide compound. The metal alkoxide compound or semimetal alkoxide compound hydrolyzed is preferably an alkoxide compound of the elements Zr, Al, Si, Ti, Sn and Y or at least one metal nitrate, metal carbonate or metal halide selected from the metal salts of the elements Zr, Al, Ti, Si, Sn and Y as a metal compound. The hydrolysis is preferably carried out in the presence of liquid water, water vapor, ice or an acid or a combination thereof.

One embodiment of the process according to the invention comprises preparing particulate sols by hydrolysis of the compounds to be hydrolyzed. These particulate sols are notable for the compounds formed by hydrolysis being present in the sol in particulate form. The particulate sols can be prepared as described above or as in WO 99/15262. These sols customarily have a very high water content, which is preferably above 50% by weight. It can be advantageous for the compound to be hydrolyzed to be introduced into alcohol or an acid or a combination thereof prior to hydrolysis. The hydrolyzed compound may be peptized by treatment with at least one organic or inorganic acid, preferably with a 10-60% organic or inorganic acid, particularly preferably with a mineral acid selected from sulfuric acid, hydrochloric acid, perchloric acid, phosphoric acid and nitric acid or a mixture thereof. The particulate sols thus prepared can subsequently be used for preparing suspensions, in which case it is preferable to prepare suspensions for application to natural fiber nonwovens or to polymeric sol pretreated polymeric fiber nonwovens.

In a further embodiment of the process according to the invention, hydrolysis of the compounds to be hydrolyzed is used to prepare polymeric sols. These polymeric sols are notable for the fact that the compounds formed by hydrolysis are present in the sol in polymeric form, ie. in the form of chains crosslinked across a relatively large space. The polymeric sols customarily include less than 50% by weight and preferably much less than 20% by weight of water and/or aqueous acid. To obtain the preferred fraction of water and/or aqueous acid, the hydrolysis is preferably carried out in such a way that the compound to be hydrolyzed is hydrolyzed with from 0.5 to 10 times the molar ratio and preferably with half the molar ratio of liquid water, water vapor or ice, based on the hydrolyzable group of the hydrolyzable compound. The amount of water used can be up to 10 times in the case of compounds which are very slow to hydrolyze, such as tetraethoxysilane. Compounds which are very fast to hydrolyze, such as zirconium tetraethoxide, are perfectly capable under these conditions of forming particulate sols as it is, which is why it is preferable to use 0.5 times the amount of water to hydrolyze such compounds. A hydrolysis with less than the preferred amount of liquid water, water vapor or ice likewise leads to good results, although using more than 50% less than the preferred amount of half the molar ratio is possible but not very sensible, since hydrolysis would no longer be complete and coatings based on such sols not very stable using an amount below this value.

To prepare these polymeric sols having the desired, very low fraction of water and/or acid in the sol, it can be advantageous for the compound to be hydrolyzed to be dissolved in an organic solvent, especially ethanol, isopropanol, butanol, amyl alcohol, hexane, cyclohexane, ethyl acetate and or mixtures thereof, before the actual hydrolysis is carried out. A sol thus prepared can be used for preparing the suspension according to the invention or as an adhesion promoter in a pretreatment step.

Both the particulate sols and the polymeric sols can be used as a sol to prepare the suspension in the process according to the invention. Not just sols which are obtainable as just described can be used, but in principle also commercially available sols, for example zirconium nitrate sol or silica sol. The process of preparing membranes by applying a suspension to and solidifying it on a carrier is known per se from WO 99/15262, but not all the parameters and input materials are applicable to the preparation of the membrane according to the invention. More particularly, the operation described in WO 99/15262 is not fully applicable to polymeric nonwoven materials in this form, since the very watery sol systems described therein frequently did not provide complete, in-depth wetting of the customarily hydrophobic polymeric nonwovens, since the most polymeric nonwovens are only badly wetted by the very watery sol systems, if at all. It has been determined that even the minutest unwetted areas in the nonwoven material can lead to membranes being obtained that have defects and hence are inutile.

It has now been found, surprisingly, that a sol system or suspension whose wetting behavior has been adapted to the polymers will completely penetrate the nonwoven materials and so provide defect-free coatings. In the process according to the invention, it is therefore preferable to adapt the wetting behavior of the sol or suspension. This is preferably done by preparing polymeric sols or suspensions from polymeric sols, these sols comprising one or more alcohols, for example methanol, ethanol or propanol or mixtures comprising one or more alcohols and also preferably aliphatic hydrocarbons. But other solvent mixtures are also conceivable for addition to the sol or suspension to adapt the wetting behavior thereof to the substrate used.

It has been determined that the fundamental change in the sol system and of the suspension resulting therefrom leads to a distinct improvement in the adhesion properties of the ceramic components on the and in a polymeric nonwoven material. Such good adhesion strengths are normally not obtainable with particulate sol systems. Preference is therefore given to coating substrates comprising polymeric fibers using suspensions which are based on polymeric sols or were finished with an adhesion promoter in a preceding step by treatment with a polymeric sol.

It can be advantageous for the suspension to be prepared by using an inorganic component comprising at least one oxide selected from the oxides of the elements Y, Zr, Al, Si, Sn and Ti and suspended in a sol. Preference is given to suspending an inorganic component which comprises at least one compound selected from aluminum oxide, titanium dioxide, zirconium oxide and/or silicon dioxide. The mass fraction of the suspended component is preferably from 0.1 to 500 times, more preferably from 1 to 50 times and most preferably from 5 to 25 times that of the sol used.

It can be advantageous to suspend in at least one sol at least one inorganic component having an average particle size of from 1 to 10 000 nm, preferably from 1 to 10 nm, from 10 to 100 nm, from 100 to 1000 nm or from 1000 to 10 000 nm, more preferably from 250 to 1750 nm and most preferably from 300 to 1250 nm. The use of inorganic components having an average particle size of from 250 to 1250 nm confers a particularly highly suitable bendability and porosity on the membrane.

To improve the adhesion of the inorganic components to polymeric fibers as a substrate, it can be advantageous for the suspensions used to be admixed with adhesion promoters, for example organofunctional silanes or else pure oxides such as $ZrO_2$, $TiO_2$, $SiO_2$ or $Al_2O_3$, in which case it is preferable to admix the adhesion promoters especially to suspensions based on polymeric sols. Useful adhesion promoters include in particular compounds selected from the octylsilanes, the fluorinated octylsilanes, the vinylsilanes, the amine-functionalized silanes and/or the glycidyl-functionalized silanes, for example the Dynasilanes from Degussa. Particularly preferred adhesion promoters for polytetrafluoroethylene (PTFE) include for example fluorinated octylsilanes, for polyethylene (PE) and polypropylene (PP) they are vinyl-, methyl- and octylsilanes, although an exclusive use of methylsilanes is not optimal, for polyamides and polyamines they are amine-functional silanes, for polyacrylates and polyesters they are glycidyl-functionalized silanes and for polyacrylonitrile it is also possible to use glycidyl-functionalized silanes. Other adhesion promoters can be used as well, but they have to be adapted to the respective polymers. The WO 99/15262 addition of methyltriethoxysilane to the sol system in the coating of polymeric carrier materials is a comparatively bad solution to the adhesivity problem of ceramics on polymeric fibers. Furthermore, the drying time of from 30 to 120 min at from 60 to 100° C. in the case of the sol systems described is not sufficient to obtain hydrolysis-resistant ceramic materials. This means that these materials will dissolve or become damaged in the course of prolonged storage in aqueous media. On the other hand, the thermal treatment at above 350° C. that is described in WO 99/15262 would lead to an incineration of the polymeric nonwoven used here and hence to the destruction of the membrane. The adhesion promoters accordingly have to be selected so that the solidification temperature is below the melting or softening temperature of the polymer and below its decomposition temperature. Suspensions according to the invention preferably include distinctly less than 25% by weight and more preferably less than 10% by weight of compounds capable of acting as adhesion promoters. An optimal fraction of adhesion promoter results from coating the fibers and/or particles with a monomolecular layer of the adhesion promoter. The amount in grams of adhesion promoter required for this purpose can be obtained by multiplying the amount in g of the oxides or fibers used by the specific surface area of the materials in $m^2$ g-1 and then dividing by the specific area required by the adhesion promoter in $m^2 g^{-1}$, the specific area required frequently being on the order of from 300 to 400 $m^2 g^{-1}$.

The table which follows contains an illustrative overview over usable adhesion promoters based on organofunctional silicon compounds for typical nonwoven material polymers.

| Polymer | Organofunction type | Adhesion Promoter |
| --- | --- | --- |
| PAN | Glycidyl | GLYMO |
|  | Methacryloyl | MEMO |
| PA | Amino | AMEO, DAMO |
| PET | Methacryloyl | MEMO |
|  | Vinyl | VTMO, VTEO, VTMOEO |
| PE, PP | Amino | AMEO, AMMO |
|  | Vinyl | VTMO, VTEO, Silfin |
|  | Methacryloyl | MEMO | where:
AMEO = 3-aminopropyltriethoxysilane
DAMO = 2-aminoethyl-3-aminopropyltrimethoxysilane
GLYMO = 3-glycidyloxytrimethoxysilane
MEMO = 3-methacryloyloxypropyltrimethoxysilane
Silfin = vinylsilane + initiator + catalyst
VTEO = vinyltriethoxysilane
VTMO = vinyltrimethoxysilane
VTMOEO = vinyltris(2-methoxyethoxy)silane The coatings according to the invention are applied to the substrate by solidifying the suspension in and on the substrate. According to the invention, the suspension present on and in the substrate can be solidified by heating at from 50 to 350° C. Since the maximum temperature is dictated by the substrate when polymeric substrate materials are used, the maximum temperature must be adapted accordingly. Depending upon the embodiment of the process according to the invention, the suspension present on and in the substrate is solidified by heating at from 100 to 350° C. and most preferably by heating at from 110 to 280° C. It can be advantageous for the heating to take place at from 100 to 350° C. for from 1 second to 60 minutes. It is more preferable to solidify the suspension by heating at from 110 to 300° C. and most preferably at from 110 to 280° C. and preferably for from 0.5 to 10 min.

Depending on the temperature level chosen to solidify the membrane, some polymer materials may undergo changes in their chemical structure under the thermal influence, so that the polymers are subsequently no longer present in their original state or original modification. For instance, polyimides may partially carbonize and polyacrylonitrile may form so-called ladder polymers which subsequently undergo a partial carbonization. These effects will always lead to a change in the properties of the carrier materials. This can also be specifically intended, depending on the intended application, since, for example, the solvent, acid and alkali resistance may be enhanced as a result. The degree of transformation involved can be affected via the temperature and the time.

The assembly may be heated according to the invention by means of heated air, hot air, infrared radiation or by other heating methods according to the prior art.

In a particular embodiment of the process according to the invention, the abovementioned adhesion promoters are applied to the substrate, especially to the polymeric nonwoven, in a preceding step. To this end, the adhesion promoters are dissolved in a suitable solvent, for example ethanol. This solution may additionally include a small amount of water, preferably from 0.5 to 10 times the molar amount of the hydrolyzable group, and small amounts of an acid, for example HCl or $HNO_3$, as a catalyst for the hydrolysis and condensation of the Si—OR groups. This solution is applied to the substrate by the known techniques, for example spraying on, printing on, pressing on, pressing in, rolling on, knifecoating on, spreadcoating on, dipping, spraying or pouring on, and the adhesion promoter is fixed on the substrate by a thermal treatment at from 50 to not more than 350° C. It is only after the adhesion promoter has been applied that this embodiment of the process according to the invention has the suspension being applied and solidified.

In another embodiment of the process according to the invention, adhesion-promoting layers are applied in a pretreatment step in which a polymeric sol is applied and solidified. The polymeric sol is preferably applied and solidified in the same way as the suspensions are applied and solidified. Application of these polymeric sols renders the substrates, especially the polymeric nonwovens, finished with an oxide of Al, Ti, Zr or Si as an adhesion promoter and so renders the substrate hydrophilic. Thus rendered substrates can then be given a porous coating as described in WO 99/15262 or as described above, and this coating would be observed to possess distinctly better adhesion, especially to polymeric nonwovens, as a result of the pretreatment.

A typical polymeric sol for a pretreatment is an approximately 2-10% by weight alcoholic solution of a metal alkoxide (eg. titanium ethoxide or zirconium propoxide) which may additionally include from 0.5 to 10 mol fractions of water and also small amounts of an acid as a catalyst. After such a sol has been applied to the substrate, the substrates, preferably polymeric nonwovens, are treated at a temperature of not more than 350° C. This will cause a dense film of a metal oxide to form around the substrate fibers, making it possible to infiltrate the substrate with a suspension or slip based on a commercial zirconium nitrate sol or silica sol without wetting problems.

Since polymeric sols are more likely to form dense films than particulate sols and, what is more, particulate sols always have relatively large amounts of water in the pore microstructure of the void volumes, it is simpler to dry polymeric sols than particulate sols. Nevertheless, the membranes have to be dried at temperatures of above 150° C. in order that the ceramic material may acquire sufficiently good adhesion to the carrier. Particularly good adhesions are obtainable at a temperature of at least 200° C. and very particularly good adhesions at a temperature of at least 250° C. However, in that case, it is absolutely vital to use polymers of appropriate thermal stability, for example polyethylene terephthalate (PET), polyacrylonitrile (PAN), polytetrafluoroethylene (PTFE), polyvinylidene fluoride (PVDF) or polyamide (PA). If the carrier does not possess sufficient thermal stability, the membrane can initially be preconsolidated by predrying it at a lower temperature (up to 100° C.). When the supplementary consolidation is then carried out at an elevated temperature, the ceramic layer acts as a prop for the support, so that the substrate can no longer simply melt away. These process parameters hold not only for the application and solidification of a polymeric sol, for example as an adhesion promoter, but also for the application and solidification of suspensions based on polymeric sols.

Both forms of applying an adhesion promoter prior to the actual application of the suspension provide improved adhesivity of the substrates especially with regard to aqueous particulate sols, which is why especially thus pretreated substrates can be coated according to the invention with suspensions based on commercially available sols, for example zirconium nitrate sol or silica sol. But this way of applying an adhesion promoter also means that the production process of the membrane according to the invention has to be extended to include an intervening or preliminary treatment step. This is feasible albeit more costly than the use of adapted sols to which adhesion promoters have been added, but also has the advantage that better results are obtained on using suspensions based on commercially available sols.

The process according to the invention can be carried out for example by unrolling the substrate off a roll, passing it at a speed of from 1 m/h to 2 m/s, preferably at a speed of from 0.5 m/min to 20 m/min and most preferably at a speed of from 1 m/min to 5 m/min through at least one apparatus which applies the suspension atop and into the support and at least one further apparatus whereby the suspension is solidified on and in the support by heating, for example an electrically heated furnace, and rolling the membrane thus produced up on a second roll. This makes it possible to produce the membrane according to the invention in a continuous process. Similarly, the pretreatment steps can be carried out on a continuous basis by observing the parameters mentioned.

The membranes according to the invention can be used as a separator in batteries, as a carrier for ultrafiltration, nanofiltration, reverse osmosis, gas separation or pervaporation membranes or simply as a microfiltration membrane.

The nonlimiting examples which follow illustrate the present invention.

EXAMPLE 1

Preparation of an S450PET Membrane

To 160 g of ethanol are initially added 15 g of a 5% by weight aqueous HCl solution, 10 g of tetraethoxysilane, 2.5 g of methyltriethoxysilane and 7.5 g of GLYMO Dynasilane (Degussa AG). This sol, which was initially stirred for some hours, is then used to suspend 125 g each of Martoxid MZS-1 and Martoxid MZS-3 aluminas from Martinswerke. This suspension (slip) is homogenized with a magnetic stirrer for at least a further 24 h, during which the stirred vessel has to be covered over in order that solvent may not escape.

This slip is then used to coat a PET nonwoven about 30 µm in thickness and about 20 g/m² in basis weight in a continuous roll coating process at a belt speed of about 8 m/h and T 200° C. In this roll coating process, the slip is coated onto the nonwoven using a roll turning opposite to the belt direction (the direction of movement of the nonwoven). The nonwoven subsequently passes through an oven at the stated temperature. The same method and apparatus is employed in the runs which follow. The end result obtained is a microfiltration membrane having an average pore size of 450 nm.

EXAMPLE 2

Preparation of an S240PAN Membrane

To 160 g of ethanol are initially added 15 g of a 5% by weight aqueous HCl solution, 10 g of tetraethoxysilane, 2.5 g of methyltriethoxysilane and 7.5 g of GLYMO Dynasilane. This sol, which was initially stirred for some hours, is then used to suspend 280 g of AlCoA CT1200 SG alumina. This slip (suspension) is homogenized with a magnetic stirrer for at least a further 24 h, during which the stirred vessel has to be covered over in order that solvent may not escape.

This slip is then used to coat a PAN nonwoven (Viledon 1773 from Freudenberg) about 100 μm in thickness and 22 g/m$^2$ in basis weight in a continuous roll coating process at a belt speed of about 8 m/h and T=250° C. The end result is a microfiltration membrane having an average pore size of 240 nm.

EXAMPLE 3

Preparation of an S450PO Membrane

To 160 g of ethanol are initially added 15 g of a 5% by weight aqueous HCl solution, 10 g of tetraethoxysilane, 2.5 g of methyltriethoxysilane and 7.5 g of GLYMO Dynasilane. This sol, which was initially stirred for some hours, is then used to suspend 125 g each of Martoxid MZS-1 and Martoxid MZS-3 aluminas from Martinswerke. This suspension is homogenized with a magnetic stirrer for at least a further 24 h, during which the stirred vessel has to be covered over in order that solvent may not escape.

A polyolefin nonwoven composed of polyethylene and polypropylene fibers (FS 2202-03 from Freudenberg) about 30 μm in thickness is coated with the above suspension in a continuous roll coating process at a belt speed of about 8 m/h and T=110° C. The end result is a microfiltration membrane having an average pore size of 450 nm.

EXAMPLE 4

Preparation of an S100PET Membrane

To 160 g of ethanol are initially added 15 g of a 5% by weight aqueous HCl solution, 10 g of tetraethoxysilane, 2.5 g of methyltriethoxysilane and 7.5 g of GLYMO Dynasilane. This sol, which was initially stirred for some hours, is then used to suspend 280 g of AlCoA CT3000 alumina. This suspension is homogenized with a magnetic stirrer for at least a further 24 h, during which the stirred vessel has to be covered over in order that solvent may not escape.

The above suspension is then used to coat a PET nonwoven about 30 μm in thickness and about 20 g/m$^2$ in basis weight in a continuous roll coating process at a belt speed of about 8 m/h and T=200° C. The end result is a microfiltration membrane having an average pore size of 100 nm.

EXAMPLE 5

Preparation of an S100PAN Membrane

To 160 g of ethanol are initially added 15 g of a 5% by weight aqueous HCl solution, 10 g of tetraethoxysilane, 2.5 g of methyltriethoxysilane and 7.5 g of GLYMO Dynasilane. This sol, which was initially stirred for some hours, is then used to suspend 300 g of AlCoA CT3000 alumina. This slip is homogenized with a magnetic stirrer for at least a further 24 h, during which the stirred vessel has to be covered over in order that solvent may not escape.

The above slip is then used to coat a PAN nonwoven (Viledon 1773 from Freudenberg) about 100 μm in thickness and 22 g/m$^2$ in basis weight in a continuous roll coating process at a belt speed of about 8 m/h and T=250° C. The end result is a microfiltration membrane having an average pore size of 100 nm.

EXAMPLE 6

Preparation of an S450PAN Membrane

To 160 g of ethanol are initially added 15 g of a 5% by weight aqueous HCl solution, 10 g of tetraethoxysilane, 2.5 g of methyltriethoxysilane and 7.5 g of MEMO Dynasilane. This sol, which was initially stirred for some hours, is then used to suspend 140 g each of Martoxid MZS-1 and Martoxid MZS-3 aluminas. This slip is homogenized with a magnetic stirrer for at least a further 24 h, during which the stirred vessel has to be covered over in order that solvent may not escape.

The above slip is then used to coat a PAN nonwoven (Viledon 1773 from Freudenberg) about 100 μm in thickness and 22 g/m$^2$ in basis weight in a continuous roll coating process at a belt speed of about 8 m/h and T=250° C. The end result is a microfiltration membrane having an average pore size of 450 nm possessing better adhesivity than described in Example 2.

EXAMPLE 7

Preparation of an S450PET Membrane

To 160 g of ethanol are initially added 15 g of a 5% by weight aqueous HCl solution, 10 g of tetraethoxysilane, 2.5 g of methyltriethoxysilane and 7.5 g of MEMO Dynasilane. This sol, which was initially stirred for some hours, is then used to suspend 130 g each of Martoxid MZS-1 and Martoxid MZS-3 aluminas from Martinswerke. This slip is homogenized with a magnetic stirrer for at least a further 24 h, during which the stirred vessel has to be covered over in order that solvent may not escape.

The above slip is used to coat a PET nonwoven about 30 μm in thickness and about 20 g/m$^2$ in basis weight in a continuous roll coating process at a belt speed of about 8 m/h and T=200° C. The end result is a microfiltration membrane having an average pore size of 450 nm possessing better adhesivity than described in Example 1.

EXAMPLE 8

Preparation of a Z450PAN Membrane 10 g of a 70% by weight solution of zirconium propoxide in propanol are dissolved in 340 g of propanol. This solution is admixed with 0.72 g of water and 0.04 g of concentrated hydrochloric acid by vigorous stirring. Stirring of this sol is continued for some hours. This sol is then used to coat a PAN nonwoven (Viledon 1773 from Freudenberg) about 100 μm in thickness and 22 g/m$^2$ in basis weight in a continuous roll coating process at a belt speed of about 8 m/h and T=200° C.

1.4 g of zirconium acetylacetonate are dissolved in a mixture of 150 g of deionized water and 22.5 g of ethanol. 140 g each of MZS-1 and MZS-3 are suspended in this solution and the slip is stirred for at least 24 h. About 1 hour prior to the coating step, a further 75 g of a commercial 30% by weight zirconium nitrate sol from MEL Chemicals are added to the slip. The precoated PAN nonwoven is then coated with this slip in a second continuous roll coating process at a belt speed of about 8 m/h and T=250° C. The end result is a microfiltration membrane having an average pore size of 450 nm, possessing very good adhesivity and excellent resistance even in very alkaline media (pH>10).

What is claimed is:

1. A membrane, comprising:
a sheetlike flexible substrate having a multiplicity of openings and having a porous coating on and in said substrate, said coating comprising an adhesion promoter and one or more inorganic components,
wherein the material of said substrate is a nonwoven polymeric fiber selected from the group consisting of a polyacrylonitrile fiber, a polyamide fiber, a polyimide fiber, a poly-acrylate fiber, a polytetrafluoroethylene fiber, a polyester fiber, a polyolefin fiber and mixtures thereof, said material having a porosity of more than 50%, said substrate being from 10 to 200 µm in thickness and said coating being a porous ceramic coating,
wherein the adhesion promoter is at least one of a glycidyloxy-functionalized silane and a methacryloyloxy-functionalized silane.

2. The membrane of claim 1, wherein said nonwoven includes said polymeric fiber, which is from 1 to 25 µm in diameter.

3. The membrane of claim 1, wherein the porosity of said substrate is in the range from 50 to 97%.

4. The membrane of claim 1, wherein said coating on and in said substrate comprises an oxide of a metal selected from the group consisting of Al, Zr, Si, Ti, Y and mixtures thereof.

5. The membrane of claim 1, wherein said membrane has an average pore size in the range of from 10 to 2000 nm.

6. The membrane of claim 1, wherein said membrane has a tensile strength of more than 1 N/cm.

7. The membrane of claim 1, wherein said membrane is bendable around a radius down to 100 mm without damage.

8. The membrane of claim 1, wherein said membrane is bendable around a radius down to 2 mm without damage.

9. A process for producing a membrane as claimed in claim 1 comprising providing a substrate from 10 to 200 µm in thickness, selected from the group consisting of nonwovens of polymeric fiber, natural fiber and mixtures thereof having a porosity of more than 50%, with a coating, said coating being a porous ceramic coating which is brought onto and into said substrate by applying a suspension and heating one or more times to solidify said suspension on and in said substrate, said suspension comprising at least one oxide of a metal selected from the group consisting of Al, Zr, Si, Ti, Y and mixtures thereof and a sol.

10. The process of claim 9, wherein said suspension is brought onto and into said substrate by printing on, pressing on, pressing in, rolling on, knifecoating on, spreadcoating on, dipping, spraying or pouring on.

11. The process of claim 9, wherein said suspension comprises at least one metal oxide sol, at least one semimetal oxide sol or at least one mixed metal oxide sol or a mixture thereof and is prepared by suspending at least one inorganic component in at least one of these sols.

12. The process of claim 11, wherein said sols are obtained by hydrolyzing at least one metal compound, at least one semimetal compound or at least one mixed metal compound using water or an acid or a combination thereof.

13. The process of claim 11, wherein said sol comprises less than 50% by weight of water and/or acid.

14. The process of claim 12, wherein said metal compound hydrolyzed is at least one metal alkoxide compound or at least one semimetal alkoxide compound selected from alkoxide compounds of the elements selected from the group consisting of Zr, Al, Si, Ti, Y and mixtures thereof or at least one metal nitrate, metal carbonate or metal halide selected from metal salts of the elements selected from the group consisting of Zr, Al, Si, Ti, Y and mixtures thereof.

15. The process of claim 11, wherein said inorganic component suspended is at least one oxide selected from the oxides of the elements selected from the group consisting of Y, Zr, Al, Si, Ti and mixtures thereof.

16. The process of claim 9, wherein the mass fraction of said suspended component is from 0.1 to 500 times that of the sol used.

17. The process of claim 9, further comprising adding an adhesion promoter to said suspension.

18. The process of claim 9, further comprising adding an adhesion promoter on said fibers prior to said applying of said suspension.

19. The process of claim 17, wherein said adhesion promoter is selected from the organofunctional silanes and/or the oxides of the elements selected from the group consisting of Zr, Al, Si, Ti and mixtures thereof.

20. The process of claim 9, wherein said suspension present on and in the support is solidified by heating at from 50 to 350° C.

21. The process of claim 20, wherein said heating is effected at from 110 to 280° C. for from 0.5 to 10 minutes.

22. A method for producing batteries comprising placing a membrane as claimed in claim 1 in a battery as a separator.

23. A method comprising utilizing a membrane as claimed in claim 1 as a carrier for ultra-filtration, nanofiltration, reverse osmosis, gas separation or pervaporation membranes.

24. A method for microfiltration comprising placing a membrane as claimed in claim 1 in a microfiltration device.

25. The process of claim 12, wherein said sol comprises less than 50% by weight of water and/or acid.

26. The process of claim 18, wherein said adhesion promoter comprises at least one oxide of the elements selected from the group consisting of Zr, Al, Si, Ti and mixtures thereof.

27. The membrane of claim 1, wherein the polymeric fiber is a polyacrylonitrile fiber.

28. The membrane of claim 1, wherein the polymeric fiber is a polyamide fiber.

29. The membrane of claim 1, wherein the polymeric fiber is a polyimide fiber.

30. The membrane of claim 1, wherein the polymer fiber is a polyacrylate fiber.

31. The membrane of claim 1, wherein the polymeric fiber is polytetrafluoroethylene fiber.

32. The membrane of claim 1, wherein the polymeric fiber is polyester fiber.

33. The membrane of claim 1, wherein the polymeric fiber is a polyolefin fiber.

34. The membrane of claim 1, wherein the adhesion promoter is at least one selected from the group consisting of 3-glycidyloxytrimethoxysilane and 3-meth-acryloyloxypropyltrimethoxysilane.

35. The membrane of claim 1, wherein the substrate consists of one nonwoven polymeric fiber.

36. The membrane of claim 1, wherein the adhesion promoter is a glycidyloxy-functionalized silane.

37. The membrane of claim 1, wherein the adhesion promoter is a methacryloyloxy-functionalized silane.

38. The membrane of claim 1, wherein the nonwoven polymeric fiber has a softening temperature of 100° C. or more.

39. The membrane of claim 1, wherein the adhesion promoter is 3-glycidyloxytrimethoxy silane.

40. The membrane of claim 1, wherein the adhesion promoter is 3-methacryloyloxy propyltrimethoxy silane.

41. A membrane, comprising:
   a sheetlike flexible substrate having a multiplicity of openings and having a porous coating on and in said substrate, said coating consisting of a homogeneous mixture of an adhesion promoter-containing composition and one or more inorganic oxide components,
   wherein the material of said substrate is a nonwoven polymeric fiber selected from the group consisting of a polyacrylonitrile fiber, a polyamide fiber, a polyimide fiber, a poly-acrylate fiber, a polytetrafluoroethylene fiber, a polyester fiber, a polyolefin fiber and mixtures thereof, said material having a porosity of more than 50%, said substrate being from 10 to 200 μm in thickness, and said coating being a porous ceramic coating,
   wherein the adhesion promoter-containing composition is a reaction product of a mixture that consists of water, HCl, ethanol, tetraethoxy silane, methyltrimethoxy silane and at least one of a glycidyloxy-functionalized silane and a methacryloyloxy-functionalized silane.

42. The membrane of claim 41, wherein said nonwoven includes said polymeric fiber, which is from 1 to 25 μm in diameter.

43. The membrane of claim 41, wherein said membrane has an average pore size in the range of from 10 to 2000 nm.

44. The membrane of claim 41, wherein said membrane is bendable around a radius down to 100 mm without damage.

45. The membrane of claim 41, wherein said membrane is bendable around a radius down to 2 mm without damage.

46. The membrane of claim 41, wherein the adhesion promoter-containing product consists of reacted units of the water, the tetraethoxy silane, the methyltrimethoxysilane and at least one of the 3-glycidyloxytrimethoxysilane and the 3-meth-acryloyloxypropyltrimethoxysilane.

47. A process for producing the membrane claimed in claim 41, comprising:
   contacting the substrate with a sol comprising the adhesion promoter and the inorganic oxide components to coat the substrate with the sol,
   heating the substrate coated with the sol to dry the sol on and in the substrate and form the coating.

* * * * *